United States Patent
Lota

(10) Patent No.: US 7,150,484 B2
(45) Date of Patent: Dec. 19, 2006

(54) DOOR-CENTERING PIN WITH DUAL SNAP FIT FOR A BIN LID

(75) Inventor: Charan Singh Lota, Canton, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 70 days.

(21) Appl. No.: 10/987,354

(22) Filed: Nov. 12, 2004

(65) Prior Publication Data

US 2006/0103160 A1    May 18, 2006

(51) Int. Cl.
*B60R 7/06* (2006.01)

(52) U.S. Cl. .................... 296/37.12; 224/400

(58) Field of Classification Search .............. 296/37.8, 296/37.12; 16/249, 383; 224/400
See application file for complete search history.

(56) References Cited

U.S. PATENT DOCUMENTS

| | | | | |
|---|---|---|---|---|
| 4,014,458 A | * | 3/1977 | Berges ........................ 220/826 |
| 4,469,365 A | * | 9/1984 | Marcus et al. ............. 296/37.7 |
| 4,552,399 A | * | 11/1985 | Atarashi ................... 296/37.12 |
| 5,829,814 A | | 11/1998 | Niessner et al. ......... 296/37.12 |
| 6,527,325 B1 | * | 3/2003 | Steingrebe et al. ........ 296/37.7 |
| 2004/0089657 A1 | * | 5/2004 | Waszak ...................... 220/4.03 |
| 2004/0140685 A1 | * | 7/2004 | Bieck et al. ............. 296/37.12 |
| 2005/0218681 A1 | * | 10/2005 | DePue et al. ............ 296/37.12 |

FOREIGN PATENT DOCUMENTS

| | | |
|---|---|---|
| JP | 07-243413 | 9/1995 |
| JP | 09-048237 | 2/1997 |
| JP | 2000-219046 | 8/2000 |

* cited by examiner

*Primary Examiner*—Lori L. Coletta
(74) *Attorney, Agent, or Firm*—Gifford, Krass, Groh, Sprinkle, Anderson & Citkowski, P.C.

(57) ABSTRACT

The present invention provides a storage bin assembly that is disposable in an opening formed in a vehicle dashboard. The assembly includes a bin portion having a pivotable door that selectably allows access to an interior storage area. A lid is disposed on the bin portion and includes front and rear edges. A slot is formed within the lid that extends perpendicularly between the front and rear edges wherein a centering pin formed on the top edge of the door cooperates with the slot to cause the door to remain centered relative to the opening formed in the vehicle dashboard. The centering pin and slot are such that they are at all times hidden from the user's view when the storage bin door is being opened or closed.

9 Claims, 5 Drawing Sheets

DOOR-CENTERING PIN WITH DUAL SNAP FIT FOR A BIN LID

FIELD OF THE INVENTION

The present invention relates to storage bins for inclusion in a vehicle's dashboard and more particularly to a storage bin for inclusion in a vehicle dashboard wherein the storage bin includes a mechanism that keeps the storage bin door positionally centered relative to the opening formed in the dashboard.

BACKGROUND OF THE INVENTION

Quality is of high importance to car buyers as well as car manufacturers. One measure of quality readily perceived by customers is the cosmetic or aesthetic appeal of the vehicle's interior trim. Features such as the size and shape of gaps and flushness between mating panels or components are areas that manufacturers need to control in order to maintain the cosmetic quality of their vehicles.

When vehicles are first purchased, cosmetic quality relative to gap tolerances and flushness between mating panels and trim is at its peak. However, in many cases this initial quality diminishes quickly over time due to wear and tear and vibration during normal vehicle use and operation.

One such vehicle feature that quickly loses its cosmetic quality relative to gap sizes and lushness is the dashboard storage bin or glove box wherein the bin door is caused to fall out of desired tolerance ranges within the dashboard. This is largely due to vibration and the lack of any means to maintain the door in a desired position relative to surrounding structures.

The present invention seeks to provide a dashboard storage bin assembly that includes a mechanism for maintaining the door in a centered position relative to surrounding structures of the dashboard such that the loss of cosmetic quality and aesthetic appeal is inhibited.

SUMMARY OF THE INVENTION

The present invention provides a storage bin assembly disposable in an opening formed in a vehicle dashboard. The storage bin assembly is operative to maintain gap tolerances and flushness with mating trim at the dashboard such that cosmetic quality is maintained.

The assembly includes a bin portion having a pivotable door attached thereto. The pivotable door has a top edge and is operative to selectably permit access to an interior of the bin portion when opened by the user.

A lid is attached to the bin portion and includes front, rear and side edges. The lid is disposed with an elongated slit that extends perpendicularly between the front and rear edges.

A centering pin formed on the top edge of the door is dimensioned to be received into the slit formed in the lid. The centering pin cooperates with the slit in the lid to cause the door to remain centered relative to the opening formed in the vehicle dashboard when opening and closing the door or during nonuse.

As a further enhancement to the aesthetic appeal of the storage bin in relation to the vehicle dashboard, the slit in the lid and the centering pin are at all times hidden from view of the user. In this manner, the present invention provides a storage bin assembly disposable in an opening formed in a vehicle dashboard that maintains the cosmetic appearance relative to gap tolerances and flushness with regard to adjacent mating trim.

BRIEF DESCRIPTION OF THE DRAWINGS

A better understanding of the present invention will be had upon reference to the following detailed description when read in conjunction with the accompanying drawings in which like parts are given like reference numerals and wherein.

DETAILED DESCRIPTION OF THE INVENTION

The present invention provides a storage bin assembly that helps to achieve and maintain nominal side-to-side gap deviation for the storage bin door when disposed in an opening formed in a vehicle dashboard. In many conventional vehicles, the side-to-side gap deviation for the storage bin door was left uncontrolled and resulted in the left and right side gaps being unequal in relation to the edges of the door. The present invention provides a means of maintaining equivalent left and right side gap sizes relative to the storage bin door when the door is in the opened or closed position. Additionally, to add to the aesthetic appeal of the storage bin assembly, the centering mechanism for maintaining the nominal left and right gap sizes relative to the door is at all times hidden from the customer's view.

Figure 1A:
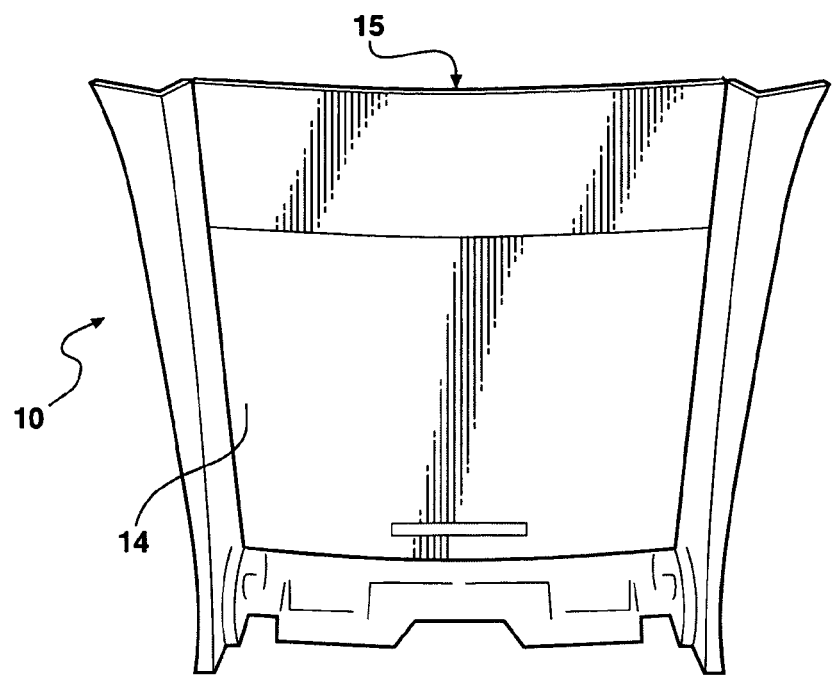
FIGS. 1A and 1B are front and rear views of the storage bin assembly to be disposed in a vehicle dashboard as according to the invention.
Figure 1B:
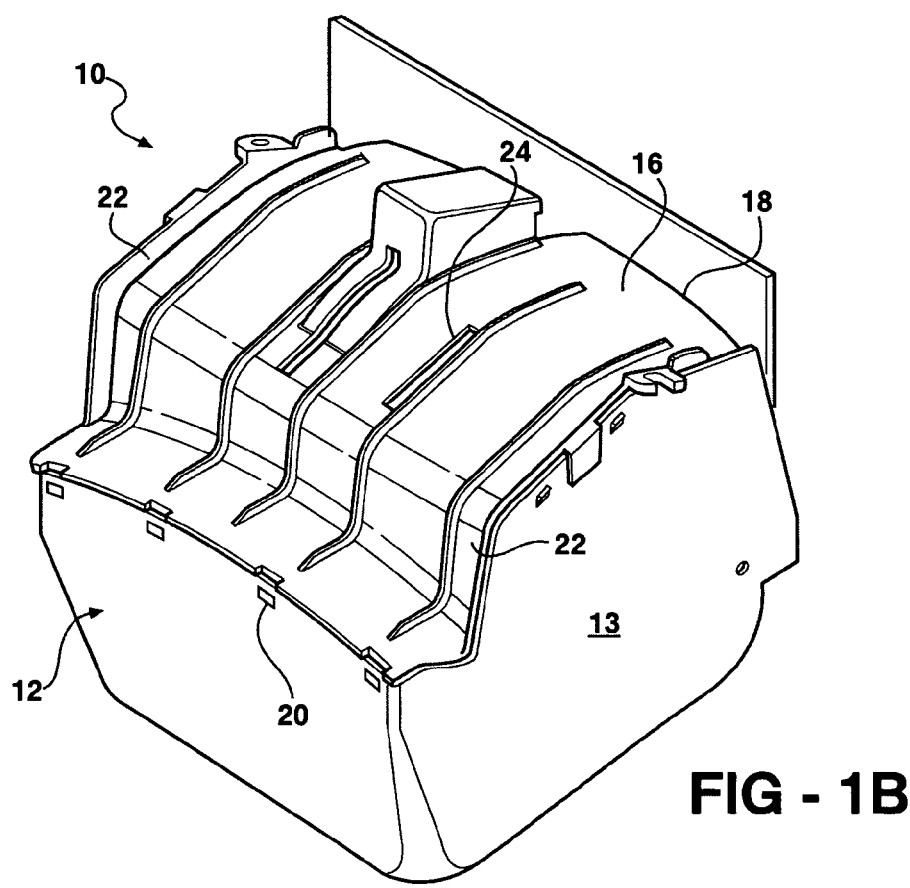
Figure 2:
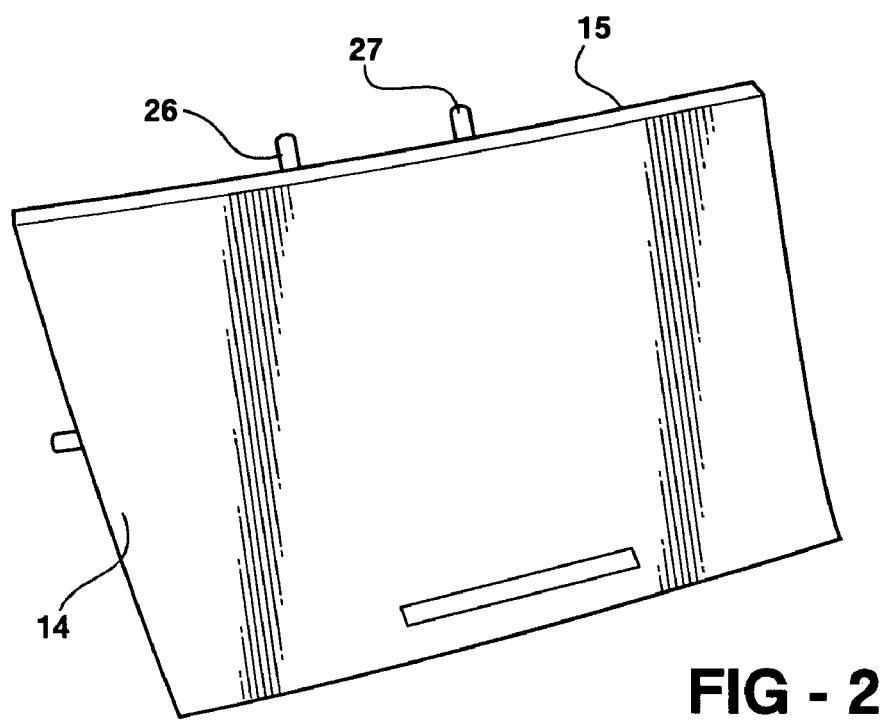
FIG. 2 illustrates the pivotable door separate from the storage bin assembly.

With reference to FIG. 1A, the present invention provides a storage bin assembly 10 disposable in an opening formed in a vehicle dashboard. As shown in FIG. 1B, the assembly 10 includes a bin portion 12 and a pivotable door 14 (FIG. 1A) having a top edge 15. The bin portion 12 has a pair of sidewalls 13 having an inner surface 17 and outer surface 19. The door 14 is pivotally mounted to the sidewalls 13 and operative to selectively permit access to an interior of the bin portion 12 as desired by the user. Preferably, the door is equipped with a grasping means for allowing the user to manipulate the door 14 about its pivot point.

A wall or lid 16 is attached to the bin portion 12 and cooperates with the pivotable door 14 to form the storage bin assembly 10 (see FIG. 1B). The lid 16 includes front 18, rear 20 and side edges 22 which are contoured to conform to the edges of the bin portion 12 of the storage bin assembly 10. The lid 16 further includes a slot 24 formed therein that extends perpendicularly between the front 18 and rear edges 20. Preferably, the lid 16 and bin portion 12 of the storage bin assembly 10 are formed of a moldable material such as plastic or metal.

A centering pin 26 is formed to extend outwardly from the top edge 15 of the door 14. The centering pin 26 is dimensioned to be received into the slot 24 formed in the lid 16 of the storage bin assembly 10. The centering pin 26 and the slot 24 cooperate to cause the door to remain centered relative to the bin portion 12 when the door is opened and/or closed. A finger 27 also extends from the top edge 15 to contact a switch that operates a lock/unlock mechanism for the bin. With the provision of the centering pin 26, the left and right side gaps between the edges of the door 14 and the dashboard trim can be set and maintained within predetermined tolerance values.

Figure 3A:
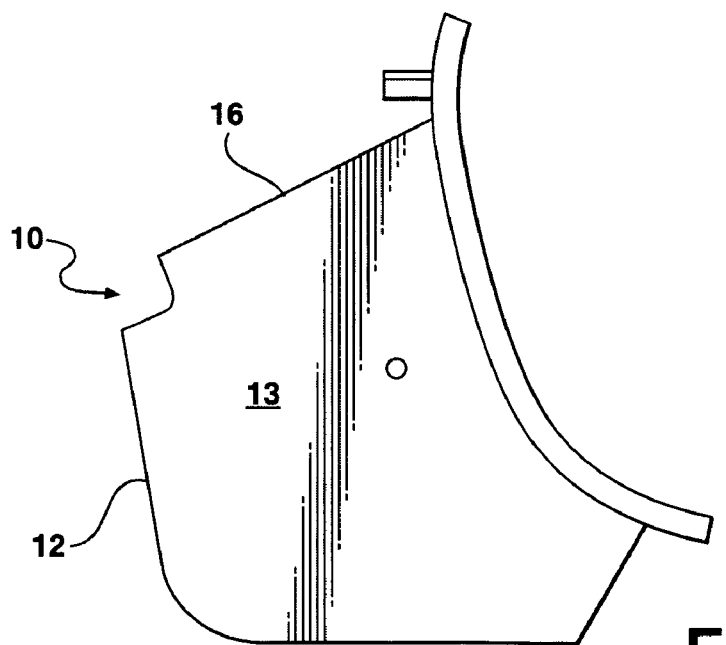
FIGS. 3A–3C illustrate side and cross-sectional views of the storage bin assembly.
Figure 3B:
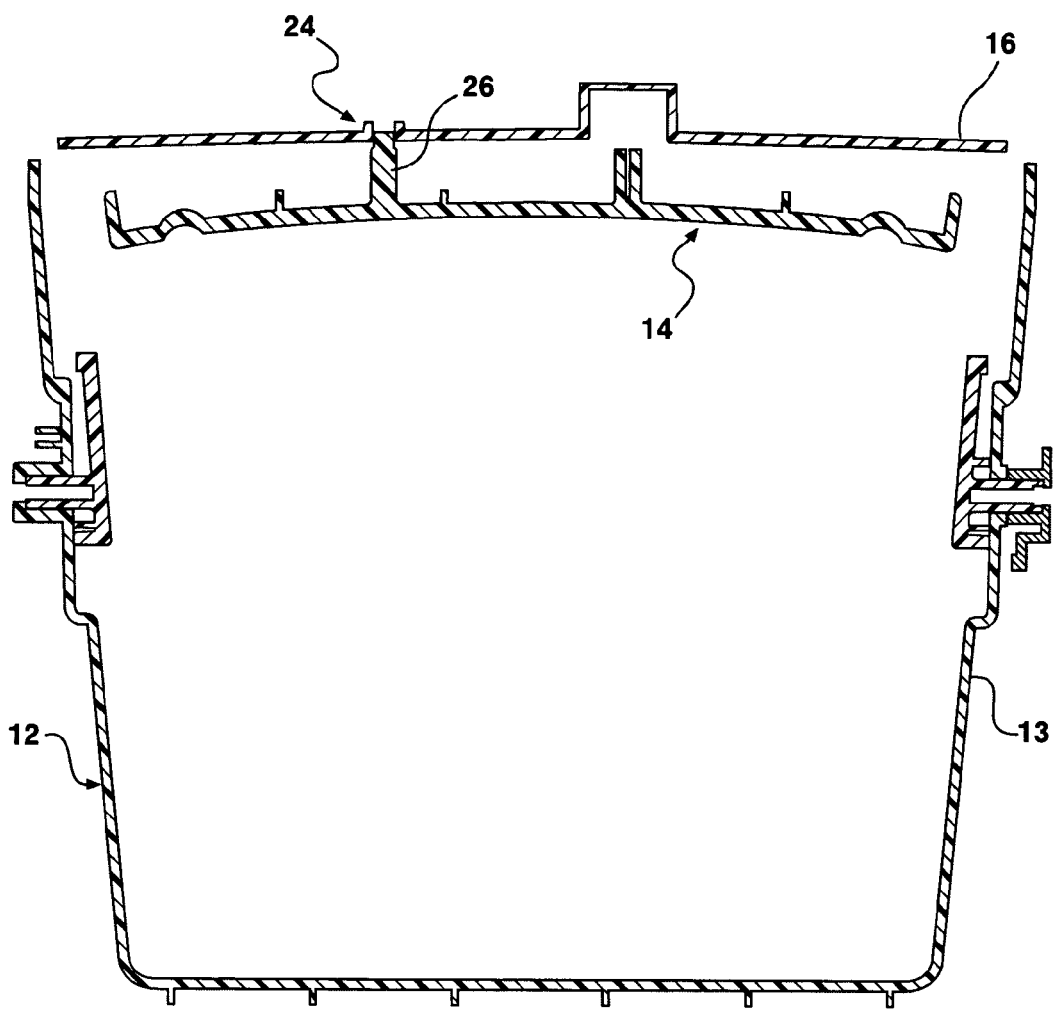
Figure 3C:
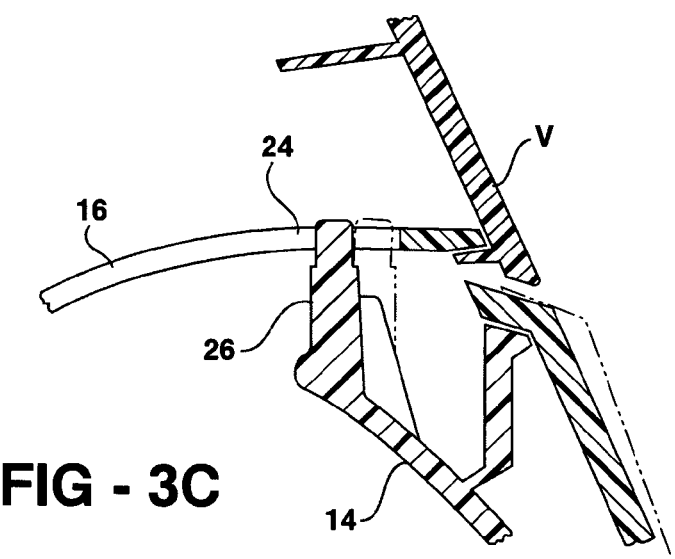

As shown in FIGS. 3A–3C, the storage bin assembly 10 provides that the centering pin 26 and slot 24 are at all times hidden from the customer's view when opening and closing the pivotable door 14. FIG. 3C illustrates a cross-sectional right side view of the storage bin assembly 10 wherein the centering pin 26 and slot 24 are hidden from the customer's view behind a vehicle trim piece V at the vehicle dashboard as the pivotable door 14 is manipulated through its push stroke. Accordingly, the inventive storage bin assembly 10 provides a device that has utility for storing items within the vehicle while maintaining its cosmetic quality relative to gap deviation and flushness with surrounding vehicle trim.

Figure 4:
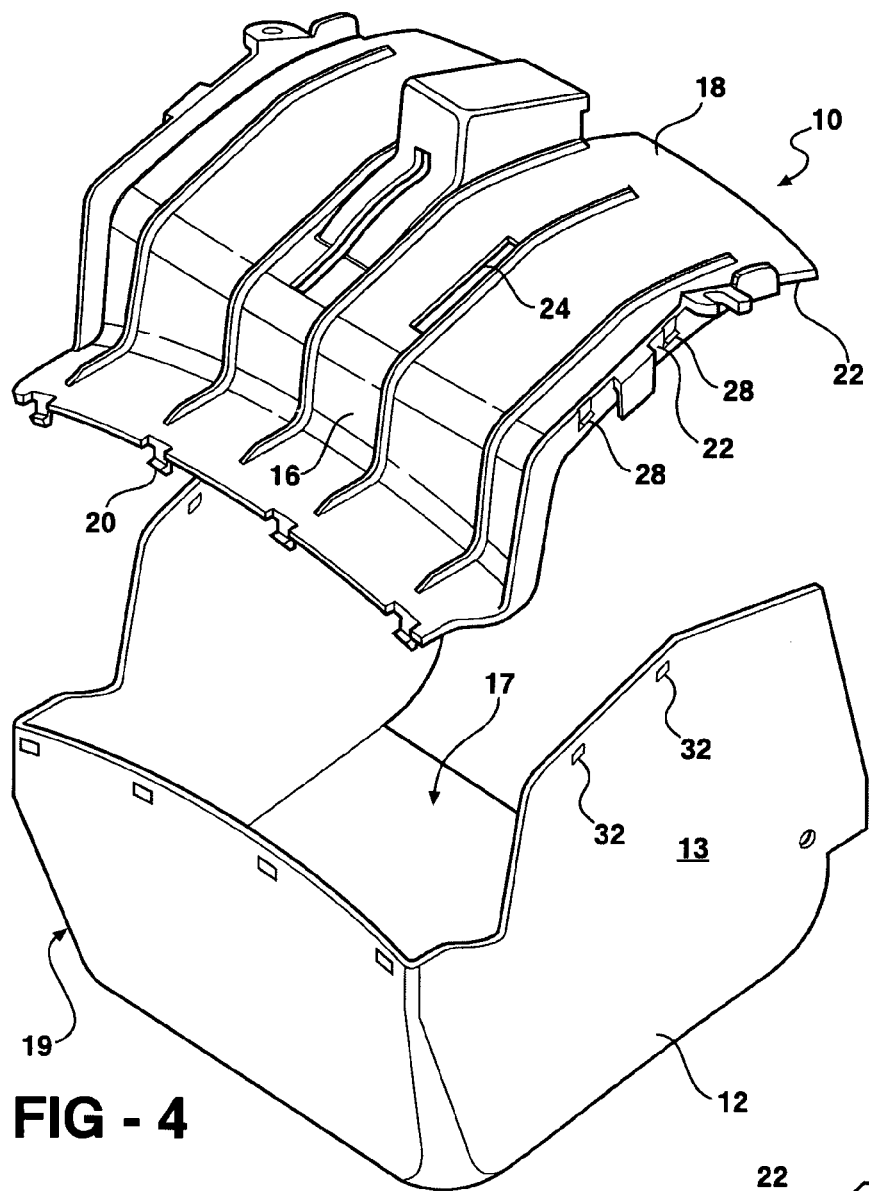
FIG. 4 illustrates a perspective view of the storage bin assembly prior to installation of the lid of the storage bin.

Referring now to FIG. 4, the storage bin assembly 10 is illustrated wherein the selectively removable lid 16 is disengaged from the storage bin 12 and pivotable door 14 of the assembly 10. The side edges 22 of the lid 16 include at least one retaining arm 30 disposed between a pair of retaining wedges 28. The retaining wedges 28 are operative to snap fittingly engage at least one retaining aperture 32 formed on the inner surface 17 in the sidewalls of the bin portion 12. The retaining arm 30 is operative to urge and secure engagement of the retaining wedges 28 within the apertures 32 formed in the sidewalls of the bin portion 12. The retaining arm 30 is L-shaped and has an elongated end portion 36 that engages the outer surface 19 of the sidewall 13. In this manner, the lid 16 may be selectably and fixedly attached to the bin portion 12 of the storage bin assembly 10 without the need for conventional fasteners. Thus, the inventive storage bin assembly 10 provides advantages over conventional storage bin assemblies relative to the cost of manufacturing, mass reduction and assembly.

Figure 6:
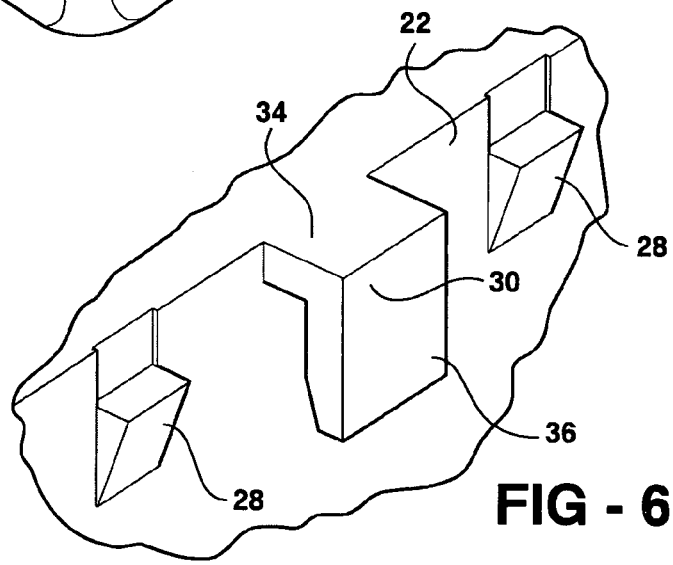
FIG. 6 is a perspective view of the retaining wedges and retaining arm as according to the invention.
Figure 5:
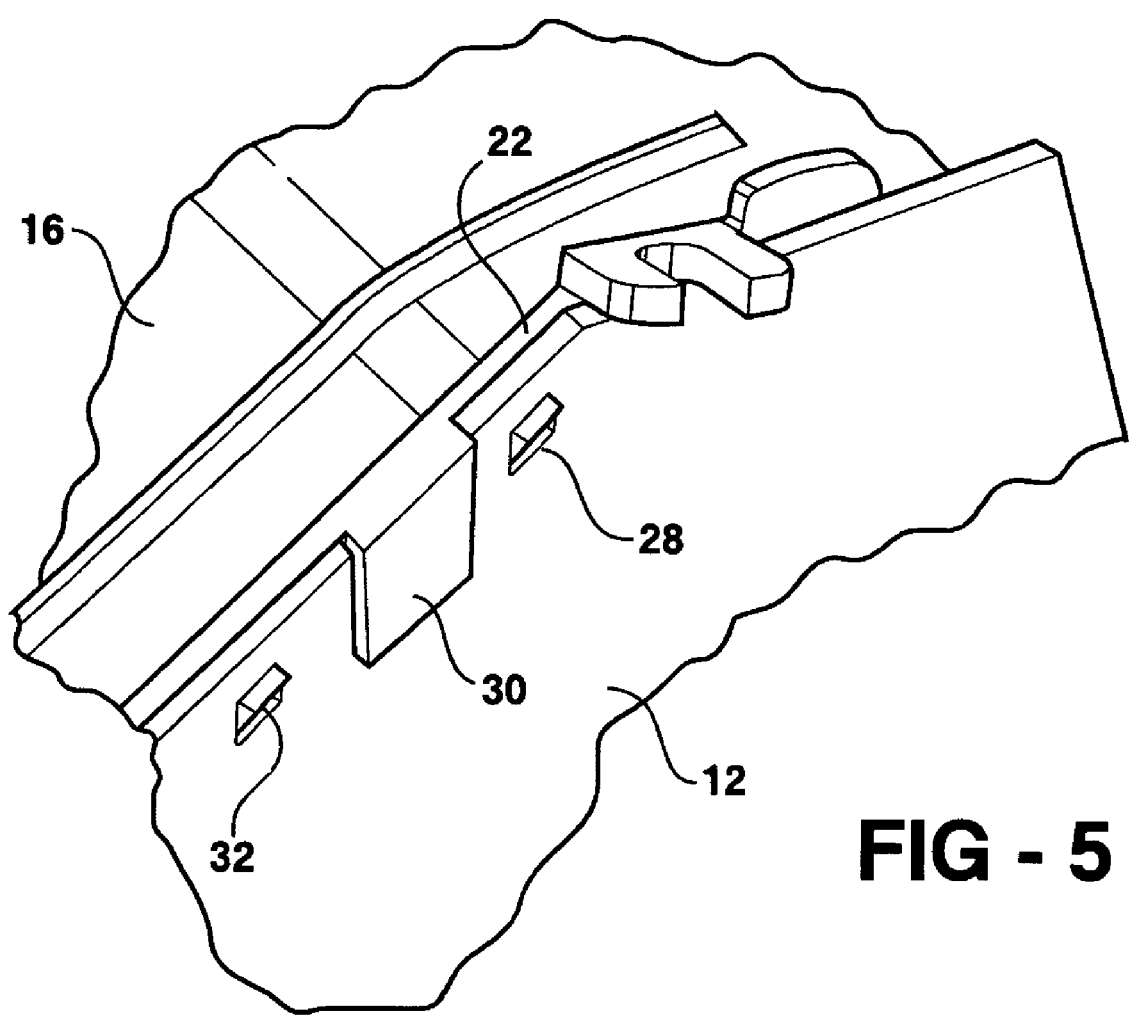
FIG. 5 illustrates a close-up view of the retaining wedges and apertures after engagement of the lid with the bin portion of the storage bin assembly.

FIGS. 5 and 6 illustrate the retaining wedges 28 and retaining arm 30 disposed on a side edge 22 of the lid 16. FIG. 5 illustrates the complementary engagement of the retaining wedges 32 and apertures 28 formed in the sidewall of the bin portion 12. The retaining arm 30 cooperates with the sidewall to urge and secure engagement between the retaining wedges 32 and apertures 28. FIG. 6 shows a close-up view of the retaining wedges 28 and retaining arm 30 wherein the retaining arm 30 is formed as an inverted L-shaped member having a base portion 34 and elongated portion 36. The base portion extends out from the side edge 22 of the lid 16 a distance that allows for the lid to be snap fitted onto the sidewalls of the bin portion 12. Once the lid 16 is seated on the bin portion 12, the elongated portion 36 of the retaining arm 30 urges the sidewall of the bin portion 12 toward the side edge 22 of the lid such that the retaining wedges 28 are well seated within the apertures 32 formed in the sidewalls of the bin portion 12. To remove the lid 16, a disengaging tool may be inserted through the apertures 32 formed in the sidewalls of the bin portion to release the retaining wedges 28 from the apertures whereby the lid can be lifted from the bin portion 12. It is appreciated that the materials used to form the lid 16 and bin portion 12 of the storage bin assembly 10 are of a resiliently durable and semi-rigid material such as plastic or semi-deformable metals. The pivotable door may be formed of a similar material as the lid and bin portion or may be formed of other materials which illustratively include polymers, wood, metal and plastic.

From the foregoing, an inventive storage bin assembly is provided that provides advantages over conventional storage bins that are disposable in a vehicle dashboard relative to maintaining cosmetic quality as well as providing a quick and simple means of assembly. Having described the storage bin assembly in detail, however, it is appreciated that many modifications thereto may become apparent to one of skill in the art without deviation from the spirit of the invention as defined by the scope of the appended claims.

I claim:

1. A storage bin assembly disposed within an opening formed in a vehicle, said storage bin assembly comprising:
    a bin portion having a pair of sidewalls and a lid that defines an interior for storage, wherein said lid has a front edge and a slot extending in a direction normal to said front edge of said lid;
    a single door movably mounted between said pair of sidewalls of said bin portion, such that said door is outwardly movable between an open position and a closed position, wherein said door has a centering pin extending outwardly from a top edge of said door that is received in the slot in said lid, when said door is in the closed position, in order to center a position of said door with respect to said bin portion.

2. The storage bin assembly of claim 1 wherein said door extends between said pair of sidewalls in the closed position.

3. The storage bin assembly of claim 2 wherein said door is movably mounted to said pair of sidewalls.

4. The storage bin assembly of claim 1 wherein said door is pivotally mounted to said bin portion.

5. A storage bin assembly disposed within an opening formed in a vehicle, said bin assembly comprising:
    a bin portion having sidewalls, said sidewalls having at least one retaining aperture formed therein;
    a door pivotably attached to said bin portion and operative to selectably allow access to an interior of said bin portion; and
    a lid having a pair of side edges, each side edge having at least one retaining wedge and at least one retaining arm, said at least one retaining wedge operative to snap fittingly engage the at least one retaining aperture of said bin portion, said at least one retaining arm operative to urge and secure engagement of said at least one retaining wedge within said at least one aperture.

6. The storage bin assembly of claim 5 wherein each of said sidewalls have an inner surface and an outer surface, said at least one retaining aperture being formed through said sidewalls.

7. The storage bin assembly of claim 6 wherein said at least one retaining arm has an end portion in engagement with said outer surface of said sidewalls.

8. The storage bin assembly of claim 5 wherein said lid has a slot and said door has a pin received in said slot, said pin sliding in said slot when said door is moved between an open and a closed position.

9. A storage bin assembly disposed within an opening formed in a vehicle, said bin assembly comprising:
    a bin portion having a pivotable door and sidewalls, said pivotable door having a top edge and operative to selectably permit access to an interior of said bin portion, said sidewalls having at least one retaining aperture formed therein;
    a lid having front, rear and side edges, each side edge being disposed with at least one retaining wedge and at least one retaining arm, said at least one retaining wedge operative to snap fittingly engage the at least one retaining aperture of said bin portion, said at least one retaining arm operative to urge and secure engagement of said at least one retaining wedge into said at least one aperture, said lid further including a slit that extends perpendicularly between said front and rear edges; and a centering pin formed adjacent said top edge of said door, said centering pin dimensioned to be received into said slit formed in said lid whereby said centering pin and said slit cooperate to cause said door to remain centered relative to said bin portion.

* * * * *